US005606234A

United States Patent [19]

Kraenzler et al.

[11] Patent Number: 5,606,234

[45] Date of Patent: Feb. 25, 1997

[54] ELECTRICALLY POWERED HAND TOOL WITH POTENTIOMETER AND PROCESS FOR ADJUSTING THE POTENTIOMETER

[75] Inventors: Ernst Kraenzler, Leinfelden-Echterdingen; Guillermo Havenstein, Filderstadt; Angelo Fernandes, Heimsheim; Ottmar Seel, Leinfelden-Echterdingen, all of Germany

[73] Assignee: Robert Bosch GmbH, Stuttgart, Germany

[21] Appl. No.: 545,628

[22] PCT Filed: Mar. 24, 1995

[86] PCT No.: PCT/DE95/00406

§ 371 Date: Nov. 3, 1995

§ 102(e) Date: Nov. 3, 1995

[87] PCT Pub. No.: WO95/26589

PCT Pub. Date: Oct. 5, 1995

[30] Foreign Application Priority Data

Mar. 25, 1994 [DE] Germany .......................... 44 10 312.3

[51] Int. Cl.$^{6}$ .............................. H02P 7/638; H01H 9/06

[52] U.S. Cl. ........................... 318/543; 200/522; 200/536

[58] Field of Search .................................... 318/543, 544, 318/545, 549, 558; 307/142; 310/50; 200/327, 522, 536; 388/937

[56] References Cited

U.S. PATENT DOCUMENTS

| | | |
|---|---|---|
| 4,118,614 | 10/1978 | Leibundgut . |
| 4,649,245 | 3/1987 | Lessig, III et al. . |
| 5,200,657 | 4/1993 | Prestel . |

*Primary Examiner*—Bentsu Ro
*Attorney, Agent, or Firm*—Michael J. Striker

[57] ABSTRACT

In known electrically operated handheld machine tools, a potentiometer serving to control output must be balanced so that a desired tap resistance can be tapped at the potentiometer in a determined adjustment position of the potentiometer. To reduce manufacturing expenses, this balancing is effected without required additional structural component parts or costly additional devices.

The potentiometer (20) has a resistance path (21) with which a slider (22) is in electrically conducting contact by pressing. The slider (22) can be actuated manually by an actuating member (15). The slider (22) and actuating member (15) have means (26) for adjusting their relative position with respect to one another after their insertion into a housing (11) of the handheld machine tool.

11 Claims, 3 Drawing Sheets

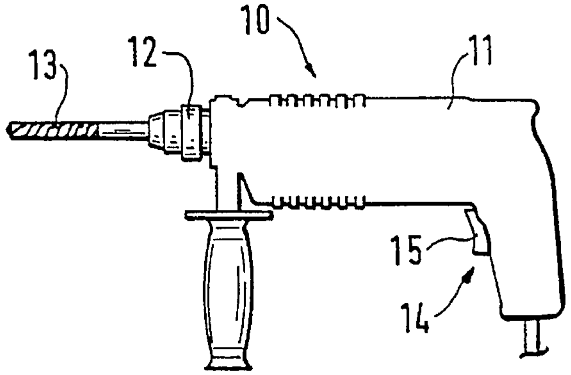
Fig. 1
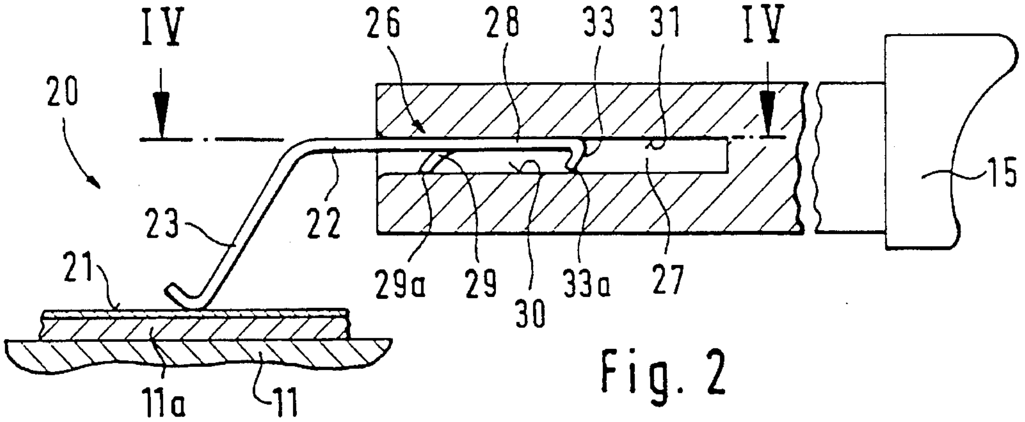
Fig. 2
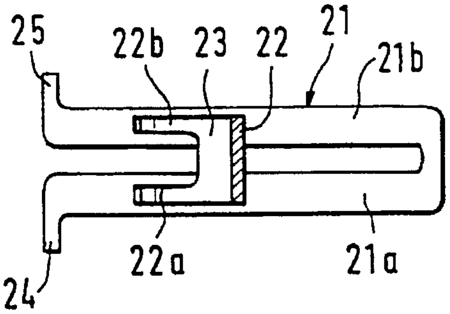
Fig. 3
Fig. 4
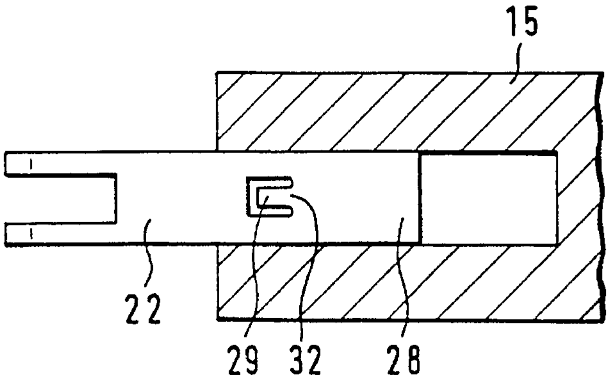

ELECTRICALLY POWERED HAND TOOL WITH POTENTIOMETER AND PROCESS FOR ADJUSTING THE POTENTIOMETER

BACKGROUND OF THE INVENTION

The invention is based on a handheld machine tool of and on a process of adjusting its potentiometer resistance. Handheld machine tools having a displaceable potentiometer which can be adjusted manually by an actuating member for controlling output are known commercially. As a result of unavoidable manufacturing tolerances and assembly tolerances the resistance in such handheld machine tools must be balanced after mounting the potentiometer in the housing by adjusting the potentiometer to a desired tap resistance at a determined setting of the actuating member. This balancing process is conventionally carried out by means of an additional balancing resistor. For example, an adjustable rotary potentiometer or an additional resistor which can be trimmed or burned off by laser technique can serve as a balancing resistor. However, the use of balancing resistors for balancing the resistance leads to additional effort resulting in unwanted additional costs, particularly for large-series manufacture.

The handheld machine tool according to the invention and the process according to the invention has the advantage over the prior art that additional balancing resistors are not required for balancing the resistance of the potentiometer so that the production costs for the handheld machine tool can be reduced.

BRIEF DESCRIPTION OF THE DRAWINGS

Embodiment examples of the invention are shown in the drawing and explained more fully in the following description.

FIG. 1 shows a plan view of a handheld power drill as an example of a handheld machine tool outfitted with a potentiometer;

FIG. 2 shows a longitudinal section through a potentiometer according to a first embodiment example;

FIG. 3 shows a top view of a resistance path of the potentiometer;

FIG. 4 shows a partial section through an actuating member of the first embodiment example;

DESCRIPTION OF THE PREFERRED EMBODIMENTS

Figure 5:
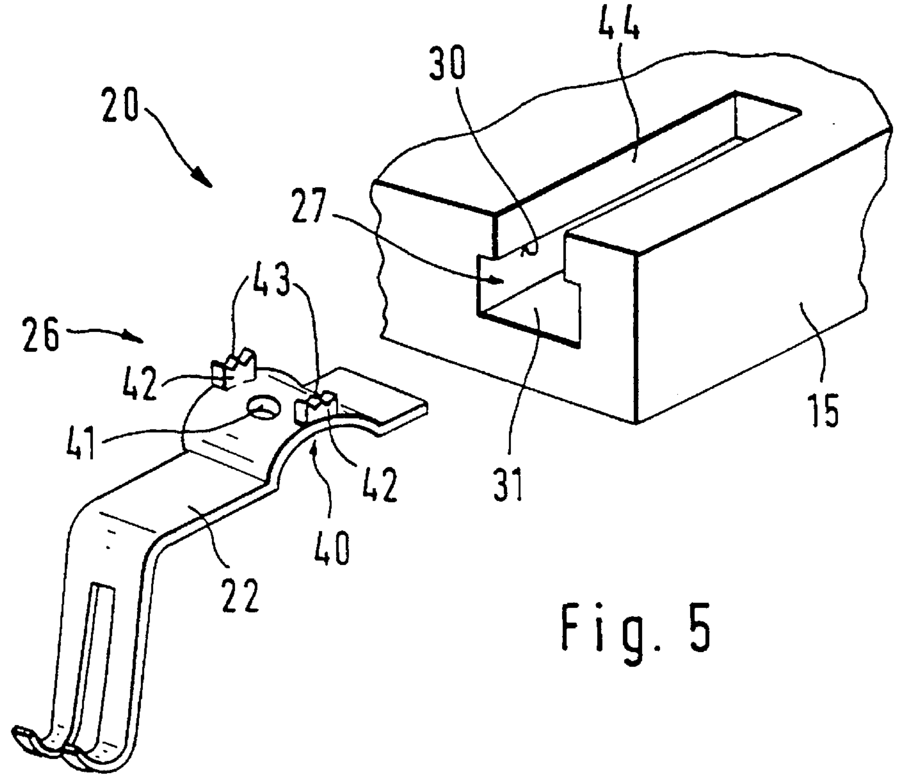
FIG. 5 shows a perspective view of a second embodiment example.

FIG. 1 shows a handheld power drill 10 as an example of an electrically powered handheld machine tool. As is known, the handheld power drill 10 has a housing 11 with an electric motor arranged therein and a tool holder 12 for receiving a drilling tool or percussive drilling tool 13, which tool holder 12 can be driven rotationally by the electric motor. The driving output of the electric motor can be controlled by a control device 14 which is constructed as a press trigger. The control device 14 has an actuating member 15 which partially projects from the housing 2. The actuating member 15 is part of a potentiometer 20 which is shown in more detail in FIG. 2.

The potentiometer 20 has an electrical resistance path 21, known per se, arranged on a resistor support 11 a which is fixed with respect to displacement relative to the housing 11. A slider 22 has pressing contact with the resistor path 21 so as to be electrically conducting. The slider 22 forms a portion of the potentiometer 20 which is displaceable relative to the housing 11 and for this purpose is connected with the actuating member 15 so as to be fixed with respect to displacement relative thereto.

As will be seen from FIG. 3, the spring end 23 of the slider 22 contacting the resistor path 21 has a fork-like design and forms two sliding fingers **22*a* and 22*b* which are electrically conducting. The resistance path 21 extends in the manner of a slide between end points 24 and 25 and has two path portions 21*a* and 21*b* which extend parallel to one another in the direction of displacement of the actuating member 15. Path portion 21 a is in electrical contact with path portion 21*b* of the resistance path 21 via sliding finger 22*a* and sliding finger 22*b* of the slider 22. The electrical resistance which takes effect in so doing is smaller than the corresponding resistance on the resistance path 21 so that the slider 22 bridges the resistance path 21. Therefore, the resistance which can be tapped between end points 24 and 25 is variable by displacing the slider 22 longitudinally along the path portions 21*a* and 21*b*. Thus a displacement of the slider 22 toward the right proceeding from the position shown in FIG. 3 increases the tap resistance because of the lengthening of the effective resistance of the resistance path 21, and a displacement toward the left causes a corresponding reduction in the tap resistance by shortening the effective resistance of the resistance path 21**.

Such sliding potentiometers are known per se. Since the resistance path 21 always exhibits certain deviations in its electrical resistance between the end points 24 and 25 as a result of manufacturing and since the relative position of the slider 22 with respect to the resistance path 21 also varies depending on tolerances, a balancing of resistance must be carried out with a balancing device after the potentiometer 20 and actuating member 15 are fitted in the housing 11 of the handheld power drill 10 so that the potentiometer 20 has a desired tap resistance in a specified setting, e.g., in a basic position.

According to the invention, it is proposed that the actuating member 15 and the slider 22 be provided with means 26 for adjusting their relative position with respect to one another. The adjusting process is carried out after their insertion into the housing 11 and the actuating member 15 and slider 22 are connected with one another in a frictional engagement and/or in a positive engagement. In the first embodiment example according to FIG. 2, a fastening recess 27 extending in the displacement direction of the slider 22 is provided for this purpose in the actuating member 15, and the end 28 of the slider 22 can be anchored therein. A fastening tongue 29 which projects at an angle from the elongated portion of the slider 22 is provided in the region of the end 28, the edge **29*a* of this fastening tongue 29 contacting a catch surface 30 of the fastening recess 27 accompanied by pretensioning. Owing to the pretensioning, the portion of the slider 22 extending in the longitudinal direction is pressed against a supporting surface 31 of the fastening recess 27, which supporting surface 31 is located opposite the catch surface 30. This produces a frictional engagement which prevents a relative displacement of the slider 22 relative to the actuating member 15 under actuating forces occurring during normal operation of the potentiometer 20. If the catch surface 30 of the fastening recess 27 is constructed so as to be relatively rough or is formed of relative soft plastic, the positive engagement can be supplemented in that the edge 29*a* hooks into or digs into the catch surface 30. Instead of a separate fastening tongue 29 or in addition to this, the end 28 of the slider 22 can also be bent to form a tab 33 as is shown in FIG. 2. The tab 33 is likewise pretensioned by an edge 33*a* at the catch surface 30 and similarly prevents unwanted displacement of the slider 22 relative to the actuating member 15**.

It will be seen from FIG. 4 that the fastening tongue 29 is punched out from the slider 22 on three sides and is connected therewith via a residual cross section 32. The residual cross section 32 is advantageously located at the side of the tongue 29 projecting farther into the fastening recess 27, since this enables an advantageous insertion of the end 28 of the slider 22 into the fastening recess 27 accompanied by a springing back of the fastening tongue 29.

FIG. 5 shows a second embodiment example of the displaceable portion of the potentiometer 20. Identical parts or parts performing identical functions in this embodiment example and in the following third embodiment example are designated by the same reference numbers as in the preceding embodiment example. Means 26 for adjusting the relative position are also constructed between the slider 22 and actuating member 15. The fastening recess 27 is arranged in the actuating member 15 in the form of a T-slot which is provided for receiving the end 28 of the slider 22. Along its longitudinal direction, the T-slot has an opening 44 through which the inserted slider 22 is accessible from the outside. The slider 22 has a bent location 40 which curves up in a U-shaped manner close to its end 28, a hole 41 being arranged centrally therein at the most elevated portion. Raised tongues 42 projecting away from the slider 22 are located in the region of the largest raised portion of the bent location 40 on the convex side. The tongues 42 are roughened at their edges 43 or carry teeth for anchoring in the catch surface 30 of the actuating member 15. The catch surface 30 can likewise be formed of plastic.

To insert the slider 22 into the fastening recess 27 the end 28 is first slid in up to the tongues 42. By applying a displacing device, e.g., a rod-shaped tool, at the hole 41, the U-shaped region of the slider 22 can be pressed together against the force of its pretensioning so that the end 28 can be slid farther into the fastening recess 27. The portion of the slider 22 projecting into the fastening recess 27 is supported at the supporting surface 31. When the bent location 40 is relaxed, this causes its original curvature to be restored and the teeth 43 of the tongues 42 are pressed against the catch surface 30 of the fastening recess 27 and accordingly provide for an anchoring of the slider 22 of the potentiometer 20 under normal load. It is possible to adjust the relative position of the slider 22 relative to the actuating member 15 at any time by pressing together the bent location 40 in both displacement directions.

Figure 6:
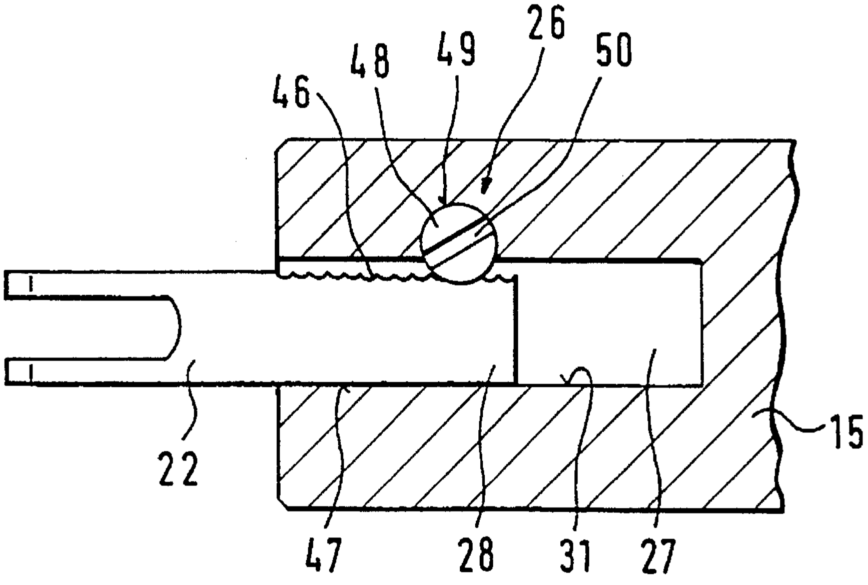
FIG. 6 shows a partial section through the actuating member of a third embodiment example.

FIG. 6 shows a third embodiment example of means 26 according to the invention. At its end 28 projecting into the fastening recess 27, the slider 22 has a toothing 46 on one side and is constructed in a planar manner on its lateral surface 47 located opposite the toothing 46. The planar lateral surface 47 is pressed against the supporting surface 31 of the fastening recess 27 by a turn pin 48. The turn pin 48 can be turned stiffly about a rotational axis oriented vertically to the displacement direction of the actuating member 15 and engages in the toothing 46 at its outer surface 49. The slider 22 can be moved into the fastening recess 27 to a varying depth by turning the turn pin 48. A groove 50 is provided at the end face of the turn pin 48 so that a suitable turning tool can be applied. The turn pin 48 is produced from relatively soft plastic, for instance, so that the toothing 46 digs into its outer surface 49. Owing to the stiff support of the turn pin 48 in the actuating member 15, the slider 22 is positioned so as to be fixed with respect to displacement relative to the actuating member 15 under normal actuating forces. The relative position of the actuating member 15 and slider 22 can be changed optionally at any time by turning the turn pin 48.

The adjustment of the desired tap resistance at the potentiometer 20 is effected in all three embodiment examples according to the following process steps. The slider 22 and the actuating member 15 are first preassembled by inserting the end 28 into the fastening recess 27. The resistance path 21 and actuating member 15 with the slider 22 are then inserted into the housing 11. The slider 22 is then moved to a specified adjusting position on the resistance path 21. Finally, the relative position of the slider 22 and actuating member 15 is changed by means 26 until the desired resistance can be tapped at the potentiometer 20. Additional resistors are not required for this balancing.

Figure 7:
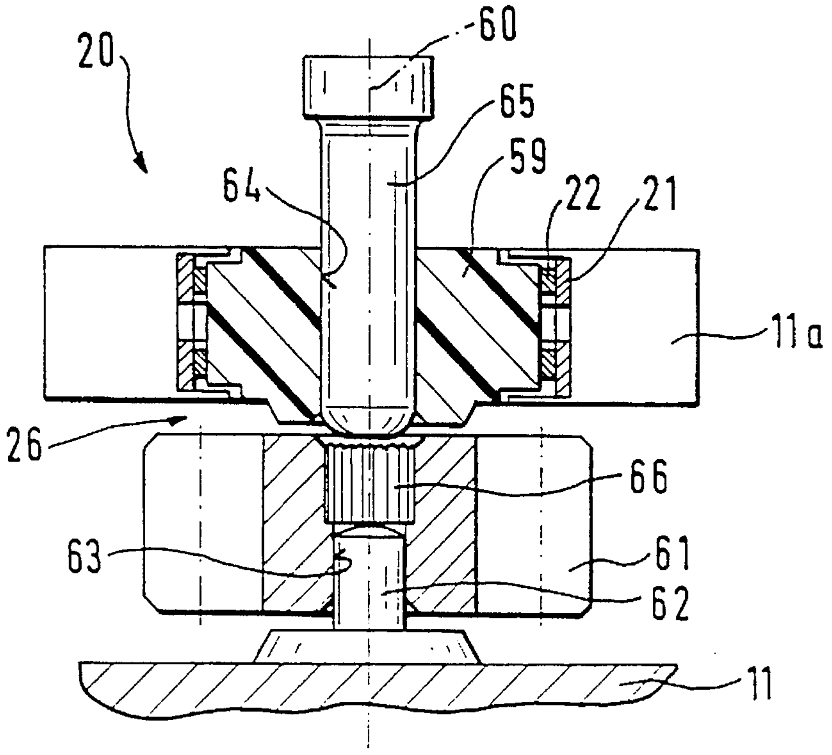
FIG. 7 shows a section through a potentiometer according to a fourth embodiment example.
Figure 8:
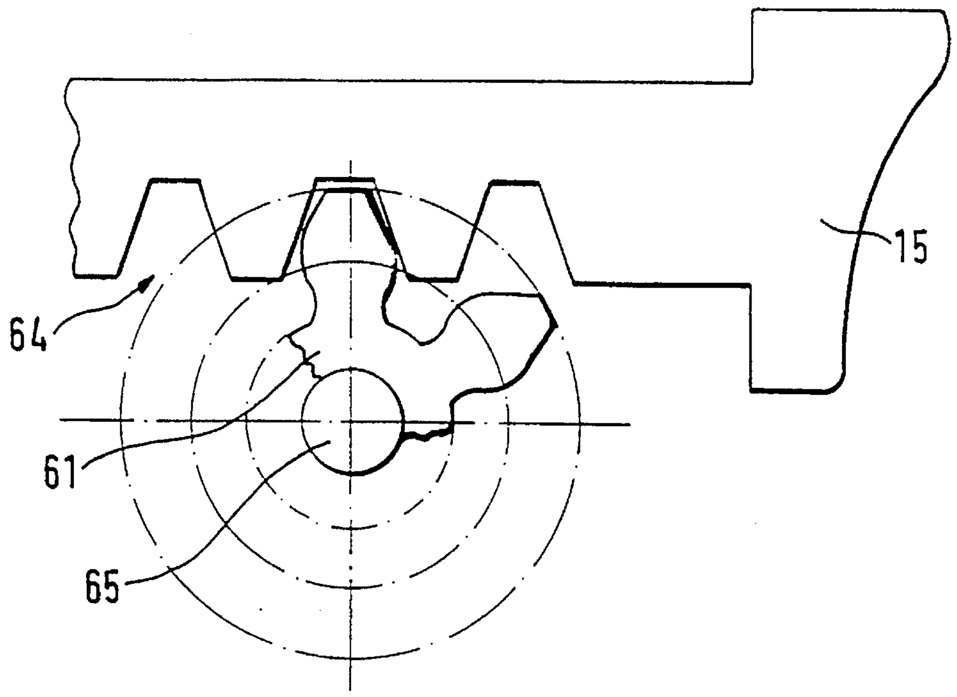
FIG. 8 shows a partial view of the actuating member according to FIG. 7.

In the fourth embodiment example shown in FIGS. 7 and 8, identical parts or parts performing identical functions are designated by the same reference numbers as in the preceding embodiment examples. The potentiometer from the preceding embodiment examples is constructed as a rotary potentiometer 20. The rotary potentiometer 20 has a potentiometer case **11*a* which is secured relative to the housing 11 of the handheld machine tool. A hub 59 forming the adjustable part of the rotary potentiometer 20 is rotatably supported centrally in the potentiometer case 11*a*. In a manner similar to the embodiment examples described above, the slider 22 and resistance path 21 are arranged between the hub 59 and the potentiometer case 11*a*, the slider 22 being fastened at the hub 59 in the fourth embodiment example shown in the drawing. The electrical resistance which can be tapped between end points of the rotary potentiometer 20 can accordingly be changed by rotating the hub 59 relative to the potentiometer case 11*a***.

A toothed wheel 61 which is rotatably supported on a bearing pin 62 which is stationary with respect to the housing is arranged parallel to the rotary potentiometer 20' and forms a common rotational axis 60 with its hub 59. The toothed wheel 61 has a central through-hole 63 which is penetrated on one side by the bearing pin 62 which projects as far as the center, this through-hole 63 being aligned with a central bore hole 64 of the hub 59.

The toothed wheel 61 engages with a toothing 64 of the actuating member 15 (FIG. 8) so that a longitudinal displacement of the actuating member 15 is transmitted to a rotating movement of the toothed wheel 61. This rotating movement can be transmitted to the hub 59 via a positioning pin 65. For this purpose, the positioning pin 65 can be pressed into the through-hole 63 of the toothed wheel 61 and the central bore hole 64 of the hub 59. Prior to this, however, the relative position of the hub 59 with respect to the toothed wheel 61 can be adjusted according to the invention in the preassembled position of the positioning pin 65 shown in FIG. 8.

As follows from FIG. 8, the toothed wheel 61 and the actuating member 15 are positively coupled. Therefore, according to the invention, it is sufficient to adjust the relative position of the toothed wheel 61 and hub 59 in order to adjust the desired tap resistance at the rotary potentiometer 20. This position is then secured by the positioning pin 65 which is driven into the through-hole 63 only after this adjustment. The positioning pin 65 forms a press fit with the toothed wheel 61 and the hub 59. The rotational engagement can be additionally improved by means of an externally toothed sleeve 66 arranged in the through-hole 63.

The adjustment of the desired tap resistance at the potentiometer 20 is effected in a manner analogous to the three embodiment examples described above. The toothed wheel 61 and the actuating member 15 and rotary potentiometer 20 are first preassembled. The positioning pin 65 is inserted into the central bore hole 64 of the hub 59. The actuating member 15 is moved into the desired adjusting position. The hub 59 is then turned via the positioning pin 65 until the desired resistance can be tapped at the end points of the resistance path. The existing relative position of the hub 59 and toothed wheel 61 is secured by driving the positioning pin 64 into the toothed wheel 61. The hub 59, toothed wheel 61, and positioning pin 65 accordingly form means 26 for adjusting the relative position of the slider (hub 59) and actuating member 15.

The rotary potentiometer 20 can also form a common constructional unit jointly with the toothed wheel 61 with a separate housing which is inserted into the housing 11 of the handheld power drill. This applies equally to the first three embodiment examples. The resistance path 21, the slider 22, and actuating member 15 can likewise form a constructional unit and can be arranged in a common housing from which the trigger projects and which is inserted into the housing 11 of the handheld power drill. The balancing can then be effected outside the housing 11.

We claim:

1. Electrically operated handheld machine tool with a potentiometer (20) which is arranged in a housing (11 ) of the handheld machine tool and which has an electrical resistance path (21) which is secured in the housing (11) so as to be stationary and a slider (22) which is in pressing contact with the resistance path (21) so as to be electrically conducting and forms a displacing unit together with an actuating member (15) which is displaceable relative to the housing (11), the handheld machine tool being provided with a balancing device for adjusting a desired tap resistance at the potentiometer (20) in a determined adjustment position of the actuating member (15), characterized in that the balancing device has means (26) for adjusting the relative position of the slider (22) and actuating member (15) relative to one another after their insertion in the housing (11).

2. Handheld machine tool according to claim 1, characterized in that the means (26) for adjusting the relative position of the slider (22) and actuating member (15) with respect to one another comprise a fastening recess (27) which extends in the actuating member (15) in the displacement direction of the actuating member (15) and slider (22), and the end (28) of the slider (22) can be anchored therein.

3. Handheld machine tool according to claim 2, characterized in that the end (28) of the slider (22) projecting into the fastening recess (27) has an edge (29*a;* 33*a*) of a fastening tongue (29) or tab (33), which edge (29*a;* 33*a*) contacts a catch surface (30) of the fastening recess (27) accompanied by pretensioning.

4. Handheld machine tool according to claim 3, characterized in that the slider (22) has a bent location (40) which curves up in a U-shaped manner in the region of the end (28) projecting into the fastening recess (27), which bent location (40) has raised tongues (42) projecting freely at the sides and having roughened or notched edges (43) which engage in the corresponding catch surface (30) of the fastening recess (27).

5. Handheld machine tool according to claim 4, characterized in that the fastening recess (27) has a T-slot with an opening (44) through which the bent location (40) of the slider (22) can be pressed together and displaced longitudinally.

6. Handheld machine tool according to claim 5, characterized in that a hole (41 ) for receiving a displacing device is constructed in the slider (22).

7. Handheld machine tool according to claim 3, characterized in that at least the catch surface (30) of the fastening recess (27) of the actuating member (15) is produced from plastic.

8. Handheld machine tool according to claim 2, characterized in that the end (28) of the slider (22) projecting into the fastening recess (27) is contacted by a turn pin (48) which is supported in the actuating member (15) so as to be stiffly rotatable.

9. Handheld machine tool according to claim 8, characterized in that the turn pin (48) is made of plastic, at least in its outer surface, and engages by its outer surface in a toothing (46) constructed at the slider (22).

10. Handheld machine tool according to claim 1, characterized in that the potentiometer is constructed as a rotary potentiometer (20 with a potentiometer case (11*a*) and a hub (59) which is rotatable relative thereto, a resistance path (21) with associated slider (22) lying between the potentiometer case (11*a*) and the hub (59), wherein the hub (59) can be connected with a toothed wheel (61) in an optional rotational position so as to be fixed with respect to rotation relative thereto, this toothed wheel (61) engaging with a toothing (64) of the actuating member (15).

11. Process for adjusting a desired tap resistance of a potentiometer (20) in an adjustment position of an actuating member (15) to be balanced in electrically operated handheld machine tools, wherein the potentiometer (20) has a resistance path (21) which is arranged in a housing (11) of the handheld machine tool and a slider (22) which is displaceable relative to the resistance path and is in electrical sliding contact with the resistance path (21) and forms a displacing unit together with the actuating member (15), characterized in that the resistance path (21) and the actuating member (15) with the slider (22) are first inserted in the housing (11), in that the actuating member (15) is moved into a specified adjustment position, in that the relative position of the slider (22) and actuating member (15) is then changed until the slider (22) taps the desired resistance in the potentiometer (20), and in the slider (22) and the actuating member (15) are finally connected with one another in this relative position so as to be fixed with respect to displacement relative to one another.

* * * * *